Figure 1:
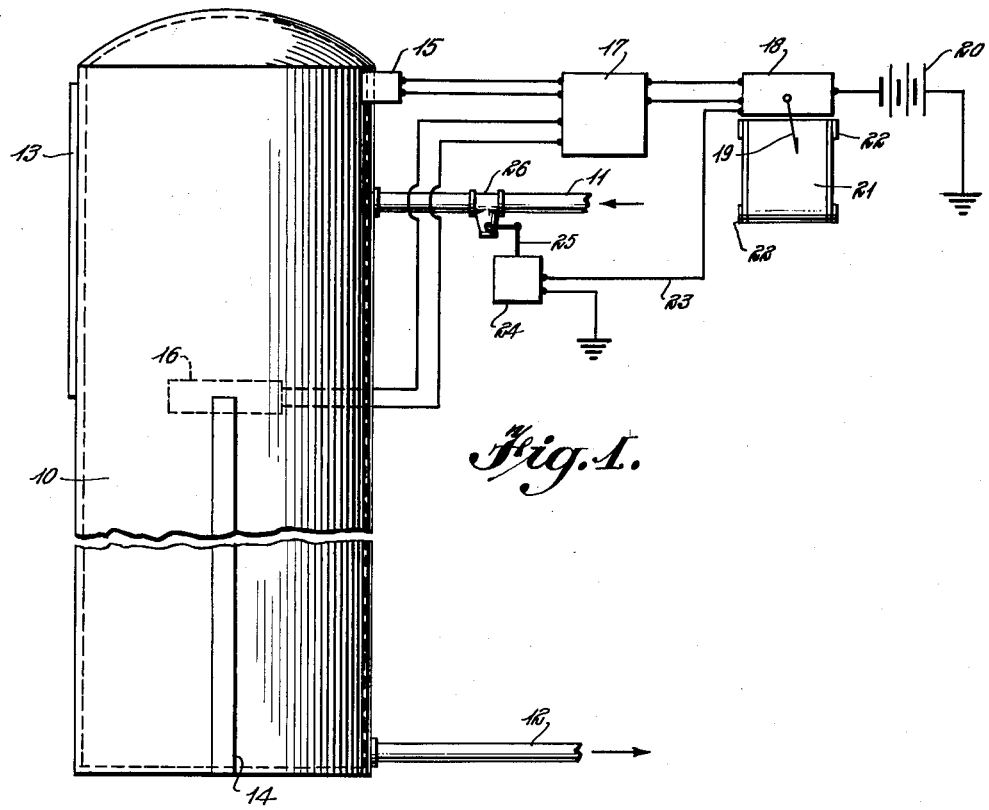

Feb. 7, 1956  R. L. ATCHISON  2,734,136
LEVEL INDICATOR
Filed Sept. 18, 1951

INVENTOR
*Robert Lee Atchison*

BY *Stevens, Davis, Miller & Mosher*
ATTORNEYS

United States Patent Office 2,734,136
Patented Feb. 7, 1956

2,734,136

LEVEL INDICATOR

Robert L. Atchison, Tulsa, Okla., assignor to Instruments, Inc., Tulsa, Okla., a corporation of Oklahoma Application September 18, 1951, Serial No. 247,101

1 Claim. (Cl. 250—43.5)

This invention relates to apparatus for measurement and control of level and is more particularly concerned with the measurement and control of the level of liquids or particle-form materials in containers.

In many manufacturing processes it is desirable to store liquids or particle-form materials in tanks. Typical of such processes occur in the chemical field. These tanks may be used to store the final product or an intermediate product, or in many cases to store some of the reactants used in the process. It is often the case that these liquids are poisonous or volatile or are stored at very high temperatures. It many of these instances it is desirable and sometimes absolutely essential that they be stored in sealed containers. Being in sealed containers, the problem of measuring their level therein is a particularly difficult one.

In an effort to overcome this problem of liquid level determination in sealed containers, various types of gauges have been developed, including gauge glasses of the sight tube type, hand valves disposed at various levels on the side of the container and mechanical floats extending through cells to indicating apparatus located externally of the tank. All of the foregoing has created new problems of construction, maintenance and operation that practically neutralize or greatly reduce their utility as liquid level indicators. For example, gauge glass tubes cannot withstand extremely high temperature and require frequent cleaning. Hand valves placed at various levels on the sides of the tank corrode rather easily and clog frequently. Also such a system offers only a crude determination of liquid level under most conditions since an operator must open and close a number of these valves to locate, and then most of the time only approximately, the level of the liquid. Mechanical floats and the like involve packing glands which are a constant source of leakage.

Other efforts to solve this problem of liquid level determination in sealed containers have been directed along the lines of radioactive devices. One such device positions a detector of radioactivity on the outside of the tank permanently fixed thereto and positions a radioactive source inside the tank in a fixed position relative to the detector. This type of device is capable only of controlling the liquid level. It cannot be used to measure varying liquid levels.

Another of these radioactive devices positions the source and detector outside the tank and provides means by which the source and detector can be moved together along the sides of the tank. This device can be used for both measurement and control of liquid level. However, to get the benefits of both at the same time is impossible. In other words, when the device is used for measuring liquid level it cannot operate to control the level. When used to control liquid level it cannot be used to measure liquid level. When the source and detector are being moved along the sides of the container to locate the level of the liquid, no control of the level therein is possible or desirable. When the source and detector are fixed at a certain height along the sides of the container for the purpose of controlling the liquid level in the container, no measurement of the level is possible. Additionally, the type of device just described includes numerous moving parts which are a constant source of maintenance trouble.

There have been devices developed which can simultaneously control liquid level in sealed containers and measure the level of the liquid therein. These devices are of the float type. A typical example of this type is disclosed in the patent to Elliott No. 2,506,585. Here the detector is located at the top of the sealed container and the source placed in a buoyant support to float on the surface of this liquid in a vertically guided path. This type of device can be used to measure and control liquid level simultaneously. However, a serious drawback is inherent in this apparatus. The buoyant float supporting the source must move in a vertical direction responsive to the rise and fall of the liquid. There is a serious danger that the float will become entangled in the guide and completely erroneous results obtained. Then, too, the maintenance problems inherent in systems including movable parts, particularly movable parts located in the interior of a tank containing chemically active substances are ever present in these "float type" devices.

It is an object of this invention to provide an apparatus for simultaneously measuring and controlling liquid levels, which apparatus eliminates all of the disadvantages of the various types of devices previously described.

More particularly, it is an object of this invention to provide an apparatus for simultaneously indicating and controlling liquid level which is simple and efficient and which presents negligible problems of maintenance and is characterized by low cost, ease of operation and high accuracy.

It is contemplated in accordance with this invention to position a radioactive source vertically along the walls of the tank in the form of a strip or the like and to position a detector of radioactive radiations at or near the top of the tank on the outside thereof and removed from the source a distance measured around the tank.

Other and further objects of the invention will become apparent from an examination of the following description of the accompanying drawings.

Figure 2:
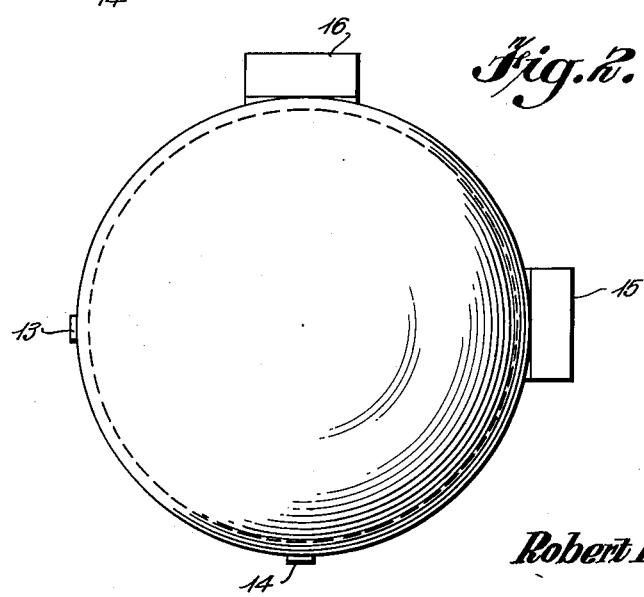

Figure 1 is a plan view of the sealed container constructed in accordance with this invention, together with the electrical system for indicating, recording and controlling the liquid level in the sealed container; and Figure 2 is a top plan view of Figure 1.

A sealed container 10 is provided with an inlet conduit 11 to introduce the liquid into the sealed container and an outlet conduit 12. Along the sides of the sealed container 10 are positioned strips of radioactive material 13 and 14. At suitable positions on the sides of the sealed container are also mounted detectors 15 and 16 capable of detecting the radiations emanating from the source materials 13 and 14. Prior to the introduction of any liquid into the sealed container 10, detectors 15 and 16 are receiving a maximum amount of radiations. As the liquid level rises, it first cuts off some of the radiations coming from source 14 and consequently decreases the amount of radiations detected by detector 16. The decrease in detector output is realized by preamplifier 17 and results in a smaller signal output therefrom to the recording network 18. This recording network 18 is typical of those used in the art and includes a stylus 19 operated by a potentiometer or the like, a battery 20 and a strip of recording paper 21 mounted to rollers 22. As the liquid level continues to rise, finally the radiations emanating from strip 14 are either completely cut off or reduced a maximum amount. A still further rise of liquid level will start to cut in on the emanations from strip 13. It can readily be seen that all during the rise of liquid level the input to the preamplifier 17 is reduced and accordingly so is the output. The decrease in output is realized by the recording network 18 and the stylus 19. Of course the chart 21 can be calibrated so that the stylus 19 directly records the liquid level in the tank.

If it is desired, the liquid level may be maintained at any predetermined height in the sealed container 10. The output from the recording network 18 is also fed through a conductor 23 to a valve motor 24. This valve motor 24 is of the conventional type commonly used in the art. It may be one in which the armature is connected to the valve element 25 controlling the valve 26 in the input line 11. When the field surrounding the armature is energized, the field of the motor is energized and the armature is retracted against the action of a spring to hold the valve in the open position. Arrangements can be made in the recording network 18 such that when the output of the preamplifier 17 drops below a certain point there is no output to the valve motor 24 through the conductor 23, thus inactivating the valve motor 24 and closing the valve 26.

It is apparent from the above that all during the entry of liquid into the container 10, the level of the liquid therein is being measured and recorded. Also it is apparent that by adjustments to the valve motor 24 and actuating networks thereto, control can be maintained over the height to which the liquid is allowed to rise in the sealed container. There is, therefore, simultaneous liquid level control and liquid level indication.

It has been found that it is preferable to make the strips of radioactive material in a certain manner. Generally speaking, the strip is made of an inert binding material impregnated with radioactive material and preferably shielded from emanating its rays in all directions, the shield mainly directing the rays towards one particular detector. Also the concentration in the inert material of the radioactive substance decreases from bottom to top, that is, the bottom portion of the strip is relatively high in concentration of radioactive material while the top is relatively low in concentration of radioactive material. This is for the reason that the top of the strip is closer to the detector picking up its rays than is the bottom which must travel, instead of a straight line distance, an angular distance depending upon the position of the detector. It is important, too, that the detector should not be saturated by the rays emitted from the portions of the strip material closest thereto. If saturation did occur, the detector would not be sensitive to increases in received energy and consequently as the liquid in the sealed container decreased there would be no way of indicating this decrease.

It is also important to note that in the embodiment described, the detector is placed 180° around the sealed container from the source energizing it. In other words, referring to Figure 2, the rays emanating from source 13 are picked up by detector 15 and the rays emanating from source 14 are picked up by detector 16. This is partly due to the shielding effect which is obtained by placing shields around the strips 13 and 14 and partially due to the attenuating effect of the wall. A ray coming out of strip 13 and going in the direction of detector 16 must pass through more than two times the width of the tank wall. On the other hand, a ray passing from strip source 13 to detector 15 passes through only two times the width of the tank wall. By decreasing the angle between, for instance, source 13 and detector 16, the attenuation increases because the energy emanating from source 13 passes more and more tangentially to the tank wall and consequently its path is more and more occupied by the tank wall. It is therefore apparent that while it is preferred that detector 15 be 180° around the tank wall from source 13 and that detector 16 be 180° around the tank wall from source 14, the two sources and two detectors need not be necessarily spaced 90° apart. Preferably, however, the spacing should be not greater than 90°.

It is important, also, to note that strip 14 is placed lower on the tank wall than strip 13, in fact the top of strip 14 begins where the bottom of strip 13 ends. This is for the reason that to have one strip and one detector, the detector being located at the top of the tank and the strip running the entire length of the tank, would mean that the amount of radioactive material at the bottommost point on the strip and the furthest point removed from the detector would have to be very large. Rather than do this, it is preferred that the tank be broken up into a number of vertical sections, each section traversed by one strip and each section having its own detector, which detector is located some distance around the container from the top of its corresponding strip.

What has been shown is a preferred embodiment of this invention. Other embodiments obvious from the teachings herein to one skilled in the art are contemplated to be within the spirit and scope of the appended claim.

It will be apparent, for example, that although this device is particularly applicable to the measurement of the level of a liquid in a sealed container, it will also measure the level of solid particle-form materials, and it will measure level in an unsealed container as well as in a sealed one.

What is claimed is:

In an apparatus for indicating the level of a material in a container that includes a source of radioactivity mounted at one side of a container and a detector of radioactivity mounted at the other side of said container and means for amplifying the output of the detector and indicating the amplified output, in which the source of radioactivity is distributed vertically along the side of the container opposite the detector from a point horizontally opposite said detector to a point substantially below said detector, the distribution of the radioactive material being such that the most intense radiation occurs at the lower end and the radiation becomes less intense toward the top end, so as to cause the detector to respond in a generally linear way to changes in the level of material within the container, a plurality of sources of radioactive material and a plurality of detectors of radiation, each of said sources of radiation being vertically contiguous with the next and horizontally offset in stepwise fashion around the container, the corresponding detectors being similarly offset.

References Cited in the file of this patent

UNITED STATES PATENTS

| | | |
|---|---|---|
| 2,401,723 | Deming | June 11, 1946 |
| 2,456,233 | Wolf | Dec. 14, 1948 |
| 2,501,560 | Blau | Mar. 21, 1950 |
| 2,506,585 | Elliott | May 9, 1950 |
| 2,534,352 | Herzog | Dec. 19, 1950 |
| 2,674,695 | Grace, Jr. | Apr. 6, 1954 |